US012566107B2

(12) United States Patent
D'Almeida et al.

(10) Patent No.: US 12,566,107 B2
(45) Date of Patent: Mar. 3, 2026

(54) INSTRUMENTATION COMB FOR AN AIRCRAFT ENGINE WITH SENSORS AND INTEGRATED ELECTRONIC SYSTEM

(71) Applicant: SAFRAN, Paris (FR)

(72) Inventors: Oscar D'Almeida, Moissy-Cramayel (FR); Raouia Ghodhbane Masmoudi, Moissy-Cramayel (FR); Sabri Janfaoui, Moissy-Cramayel (FR); Patrick Thomas, Moissy-Cramayel (FR)

(73) Assignee: SAFRAN, Paris (FR)

( * ) Notice: Subject to any disclaimer, the term of this patent is extended or adjusted under 35 U.S.C. 154(b) by 222 days.

(21) Appl. No.: 18/256,595

(22) PCT Filed: Nov. 30, 2021

(86) PCT No.: PCT/FR2021/052145
§ 371 (c)(1),
(2) Date: Jun. 8, 2023

(87) PCT Pub. No.: WO2022/123143
PCT Pub. Date: Jun. 16, 2022

(65) Prior Publication Data
US 2023/0366783 A1 Nov. 16, 2023

(30) Foreign Application Priority Data

Dec. 8, 2020 (FR) ........................................ 2012872

(51) Int. Cl.
G01M 15/14 (2006.01)
(52) U.S. Cl.
CPC .................................. G01M 15/14 (2013.01)

(58) Field of Classification Search
CPC ....................................................... G01M 15/14
See application file for complete search history.

(56) References Cited

U.S. PATENT DOCUMENTS

2012/0290250 A1* 11/2012 Snider ................... F01D 21/003
702/130
2012/0324988 A1 12/2012 Hockaday et al.
(Continued)

FOREIGN PATENT DOCUMENTS

EP 1837636 A1 9/2007

OTHER PUBLICATIONS

French Search Report issued in French Application No. 20 12872, mailed on Jul. 28, 2021.
(Continued)

*Primary Examiner* — Eric S. McCall
(74) *Attorney, Agent, or Firm* — Bookoff McAndrews, PLLC

(57) ABSTRACT

Instrumentation comb for an aircraft engine including a central tube with a longitudinal axis on which a determined number of orifices spaced apart along this longitudinal axis are drilled and a base forming a proximal end of this tube and intended to be fixed on a crankcase portion of the aircraft engine, each orifice being associated with a sensor for measuring a physical parameter of the aircraft engine and the base integrates a slave processing unit connected to each of the measuring sensors by a communication link able to receive in real time digital measurement data corresponding to the physical parameters measured by the measuring sensors and intended to be communicated to a master processing unit by a single communication link.

16 Claims, 3 Drawing Sheets

(56) References Cited

U.S. PATENT DOCUMENTS

| | | | | |
|---|---|---|---|---|
| 2018/0059656 A1 | | 3/2018 | Hiruta et al. | |
| 2018/0283960 A1 * | | 10/2018 | Giordan | G01M 15/14 |
| 2019/0323909 A1 | | 10/2019 | Burgan | |
| 2022/0412842 A1 * | | 12/2022 | O'Leary | F01D 25/285 |

OTHER PUBLICATIONS

International Search Report and Written Opinion issued in International Application No. PCT/FR2021/052145, mailed on Mar. 18, 2022.

* cited by examiner

[Fig. 1]
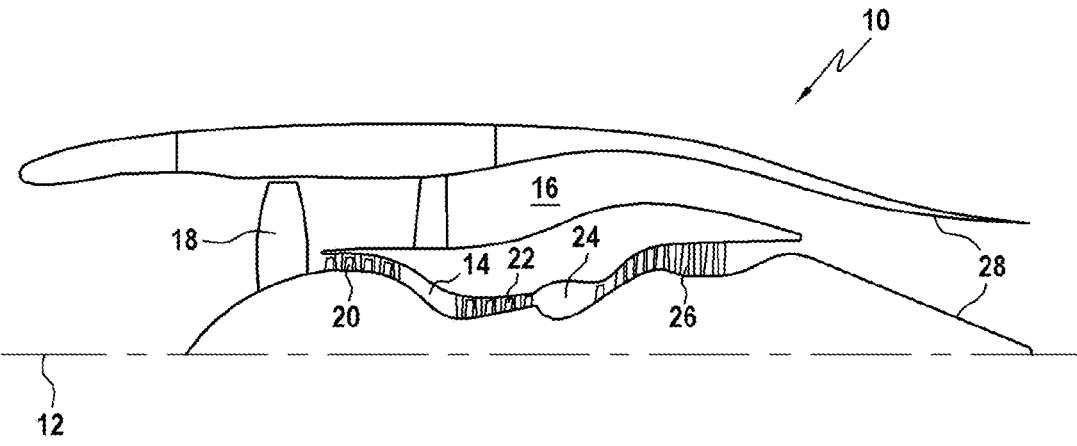
[Fig. 2]
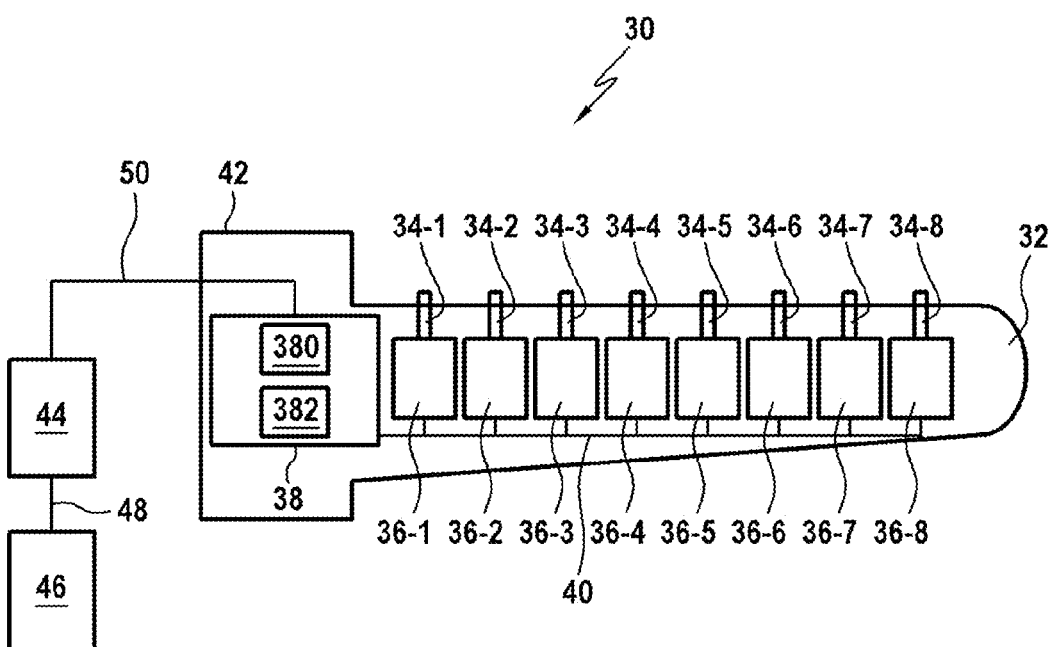

[Fig. 3]
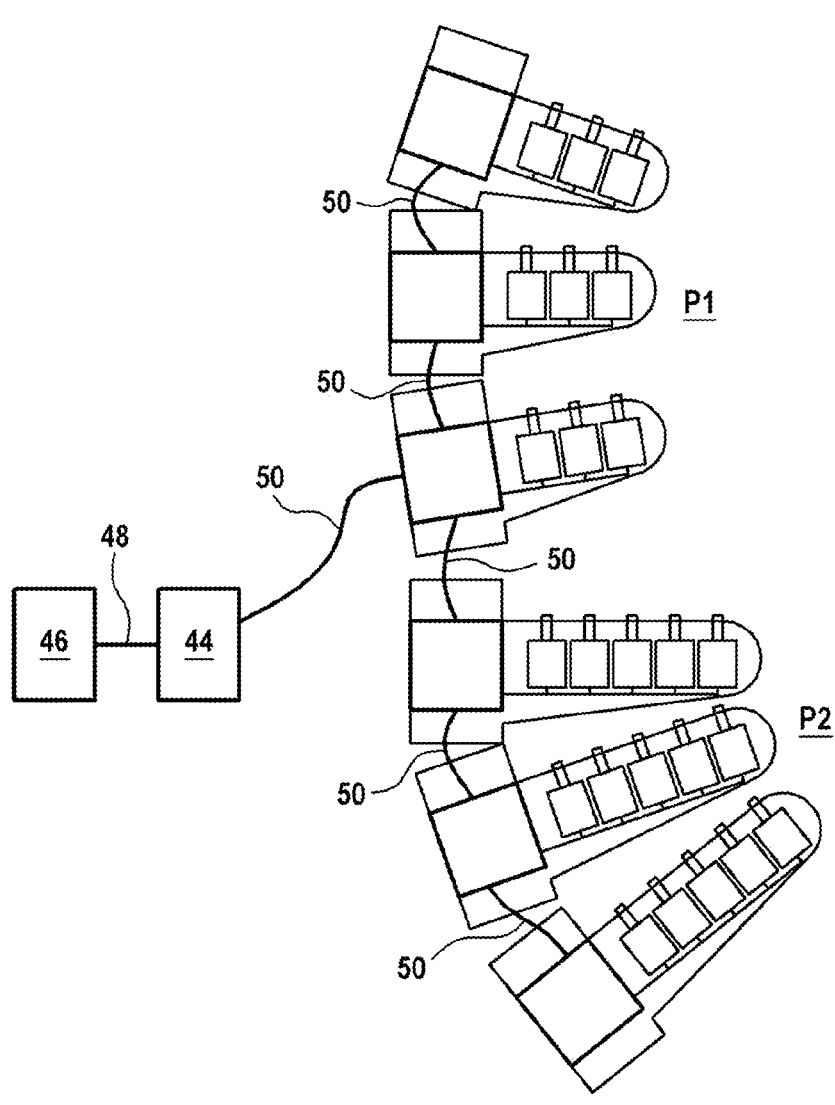

[Fig. 4]
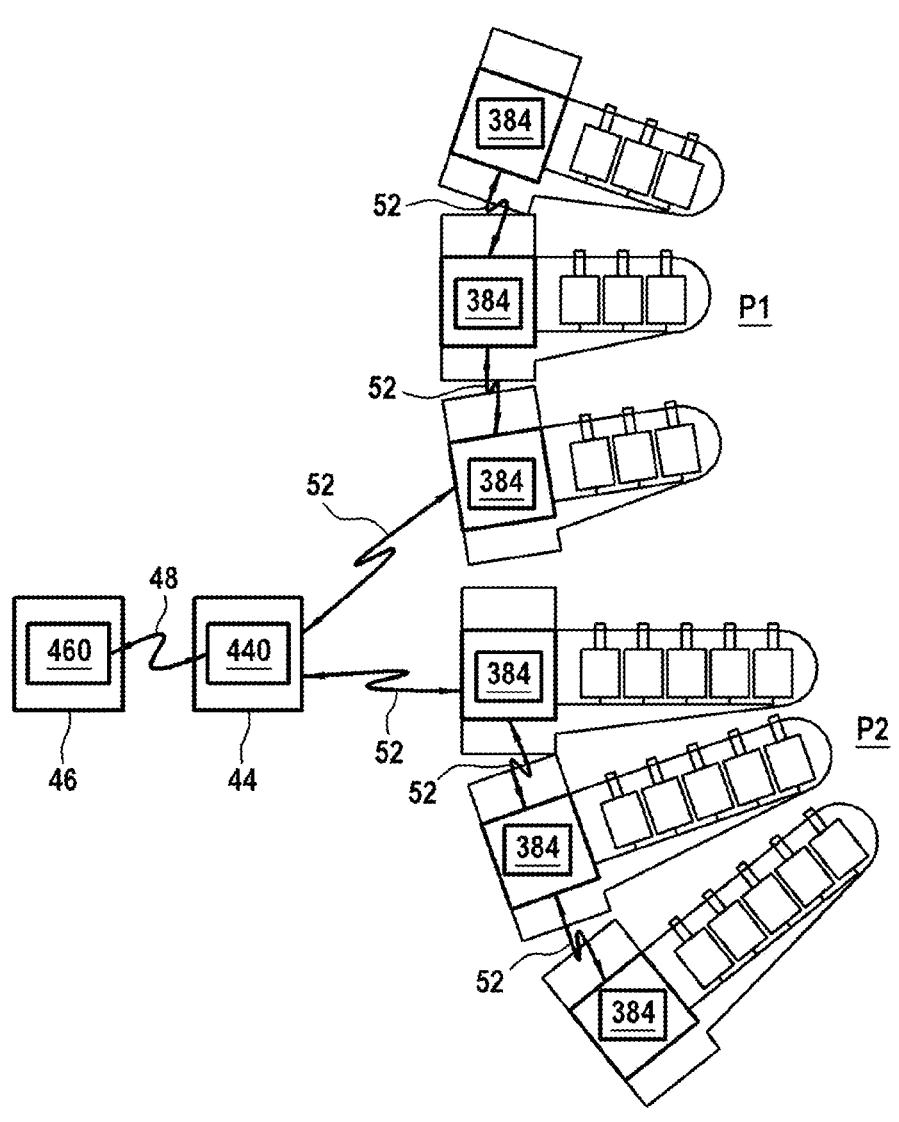

INSTRUMENTATION COMB FOR AN AIRCRAFT ENGINE WITH SENSORS AND INTEGRATED ELECTRONIC SYSTEM

CROSS-REFERENCE TO RELATED APPLICATIONS

This is a National Stage Application under 35 U.S.C. § 371 of International Application No. PCT/FR2021/052145, filed Nov. 30, 2021, now published as WO 2022/123143 A1, which claims priority to French Patent Application No. 2012872, filed on Dec. 8, 2020.

TECHNICAL FIELD

The present invention relates to the field of aeronautics and more particularly relates to the instrumentation of aircraft engines for the test, maintenance or certification measurements of equipment, on the ground or in flight, with the aim of comparing the real behavior of this equipment with its model, obtaining additional experimental values, tracking its condition and its limit parameters.

PRIOR ART

It is known for the measurement of the engine exhaust streams to use measuring "combs" responsible for collecting measurements, in particular measurements such as the pressures and temperatures (P&T) of the gases at different stages of the engine and consisting of a central tube on which a predefined number of evenly spaced holes are drilled. At the end of this tubular manifold, a base makes it possible to fix the comb to the crankcase of the engine, and to bring out the cables from the different sensors to a test bench including measuring devices.

However, when a very large number of measurement points must be taken simultaneously, which is the case with measuring benches of aircraft engines, the complexity of placing and connecting the measuring sensors to the test or measuring bench leads to a problem of implementation, in particular for the passage of the cables, and of availability, the failure rate being difficult to control with a large number of points to be processed, especially when the failure appears after assembly of the engine parts. Indeed, most of the difficulties encountered stem mainly from the point-to-point topology used, consisting in associating an analog sensor per line and per acquisition channel and which therefore requires a very large number of connection cables (in general, there are 2 or 4 wires (depending on the type of sensor) per sensor). In addition, the tubular manifold and its connection to the test bench are not without creating losses for example in the event of pressure measurement.

DISCLOSURE OF THE INVENTION

The present invention therefore relates to an aircraft engine instrumentation comb that overcomes the aforementioned drawbacks. One aim of the invention is also to overcome the harsh environment (high temperature and noise) in which the instrumentation of the aircraft engines is carried out.

These aims are achieved by an instrumentation comb for an aircraft engine including a central tube with a longitudinal axis on which a determined number of orifices spaced apart along this longitudinal axis are drilled and a base forming a proximal end of this tube and intended to be fixed on a crankcase portion of the aircraft engine, each orifice being associated with a sensor for measuring a physical parameter of the aircraft engine, characterized in that the base integrates a slave processing unit connected to each of the measuring sensors by a communication link able to receive in real time digital measurement data corresponding to the physical parameters measured by the measuring sensors and intended to be communicated to a master processing unit by a single communication link.

Thus, by integrating measuring sensors and analog-digital processing electronics into the instrumentation comb, the number of cables connected to the test bench is limited and the disturbances usually affecting these cables are avoided.

Preferably, the physical parameter is any one or a combination of the following parameters: pressure, temperature, humidity level, gas composition.

Advantageously, the single communication link is a wired or wireless link, for example the wired link is of the Ethernet or RS485 type and the wireless link is of the LoRa or WiFi type.

Preferably, the slave processing unit includes a power management module adapted to ensure the power supply of the measuring sensors and of a communication module supporting the single communication link.

The invention also relates to an array of combs formed of several instrumentation combs and in which the instrumentation combs are evenly distributed over the circumference and over several planes of the aircraft engine.

Preferably, the slave processing units of the instrumentation combs of the same plane are connected together one by one to form a circle, the single communication link with the master processing unit being achieved from at most one determined processing unit of an instrumentation comb of each plane of the array of combs.

Advantageously, a slave processing unit of a determined instrumentation comb of a given plane is connected to a slave processing unit of a determined instrumentation comb of another plane.

The invention also relates to a system for collecting measurements of a physical parameter of an aircraft engine comprising: at least an instrumentation comb as mentioned above; a master processing unit connected by a communication link to a test bench; said master processing unit being connected to the slave processing unit of said comb by a single communication link intended to supply energy to said slave processing unit and to transfer the data coming from the sensors.

The invention also relates to an aircraft engine including at least an instrumentation comb or an array of instrumentation combs as mentioned above as well as an aircraft including this engine.

BRIEF DESCRIPTION OF THE DRAWINGS

Other characteristics and advantages of the present invention will become apparent from the description given below, with reference to the appended drawings which illustrate an exemplary embodiment devoid of any limitation and on which:

FIG. 1 illustrates a conventional aircraft engine architecture including an instrumentation comb in accordance with the invention, FIG. 2 shows an example of an eight-sensor instrumentation comb connected via a single wired link to an engine test bench, FIG. 3 shows an example of an array of instrumentation combs connected via a wired link to an engine test bench, and FIG. 4 shows an example of an array of instrumentation combs connected via a wireless link to an engine test bench.

DESCRIPTION OF THE EMBODIMENTS

The principle of the invention is based on the integration of measuring sensors in instrumentation combs which are connected to a monitoring module via reduced wiring so as to be able to read and transmit in real time, in order to make it possible to operate the turbomachine in a reactive manner, the data from the measuring sensors and/or to control their operation.

By way of example, FIG. 1 shows a diagrammatic view in axial half-section of a turbomachine for an aircraft 10 with a longitudinal axis 12, particularly a dual-spool turbofan engine, on which one or several instrumentation combs can be mounted according to the invention. Of course, the invention is not limited to this type of dual-spool turbofan engine and it could for example apply to a single spool, to a triple spool, to a ducted fan turbojet engine with a very high bypass ratio, to a turboprop (with unducted propeller), or to an open-rotor type architecture.

Conventionally, such a turbomachine includes a primary flowpath 14 traversed by a hot stream that surrounds a secondary flowpath 16 traversed by a cold stream and it comprises from upstream to downstream with respect to the direction of the exhaust gases: a fan 18, a low-pressure compressor 20, a high-pressure compressor 22, an annular combustion chamber 24, a set of high-pressure and low-pressure turbines 26 and an exhaust nozzle 28. In the example illustrated, each of the axial compressors is provided, in a annular crankcase, with blade impellers and vane straighteners disposed alternately in a succession of adjacent compression stages.

FIG. 2 shows an example of a comb with eight orifices to instrument an engine in terms of pressure and temperature. This comb 30 includes on the one hand on a central tube 32 with a longitudinal axis, associated with each orifice 34-1 to 34-8 drilled in this tube and preferably evenly disposed along its longitudinal axis, a measuring sensor 36-1 to 36-8 ensuring, for example, as illustrated, the measurement of the pressure and of the temperature (P&T) of the gas impacting these orifices and conventionally formed of a mechanical probe and of its electronic processing interface (analog/digital adaptation and conversion). On the other hand, the comb 30 includes a slave processing unit 38 electronically connected to each of these measuring sensors by a communication link 40, preferably a synchronous serial type link, more particularly an SPI (serial peripheral interface) bus, or any other equivalent links, such as an SMB bus (system management bus) or I²C. Said slave processing unit 38 is integrated into a base 42 forming a proximal end of the central tube 32 and intended to be fixed on a crankcase portion (not represented) of the aircraft engine.

This communication link 40 makes it possible to guarantee real-time transmission of the measurement values of the measuring sensors in order to make it possible to operate the turbomachine in a reactive manner. Of course, those skilled in the art will be able to determine and adjust the necessary sampling frequency according to the type and number of measurements performed by instrumentation comb. The measurement values acquired by the sensors in analog form are directly converted at the level of the sensors, by its electronic processing interface, in the form of digital data and are then transmitted to the slave processing unit 38 via the digital communication link 40. This digitization is therefore done as close as possible to the measurement point, to limit the analog disturbances existing in a severe environment such as that of an aircraft engine and due, for example, to high temperatures or to noise.

The slave processing unit 38 is also connected, via an advantageously inner communication module 380, to a master processing unit 44. This master processing unit 44 is preferably remote from the slave processing unit 38 and it can be integrated into a test bench 46 or, advantageously, offset from the test bench 46 via a communication link 48 which can be wired, advantageously by Ethernet or RS485 cabling, or wireless (as illustrated further on in FIG. 4).

The master processing unit 44 receives the digital data resulting from the collection of the sensor measurements and sent by the communication module 380 on a single, preferably wired, communication link 50 through a reduced number of wires, advantageously 4 wires, preferably 2 wires. This single communication link 50 connects the slave processing unit 38 to the master processing unit 44 and makes it possible both to transfer the data coming from the sensors and to provide the energy necessary for the slave processing unit 38, more specifically to a power management module 382 of this unit which ensure its own power supply as well as the power supply of the communication module 380 and of the measuring sensors 36-1 to 36-8 via the digital communication link 40. Thus, the number of cables usually existing between the measuring sensors and the test bench is significantly reduced.

In one alternative embodiment, the single communication link 50 is a wireless type communication (advantageously according to the LoRa (Long Range) or WiFi protocol supported by the communication module 380).

The two previous embodiments are valid for ground and in-flight applications.

FIGS. 3 and 4 illustrate a configuration of the invention in which an aircraft engine is instrumented by a plurality of instrumentation combs, each being placed on a fixed radius in one or several determined planes (Planes P1 and P2 for example) of the motor and connected by a communication link to the following comb in order to form an array of combs in the form of one or several circles which can be connected together. The number of combs in this array each integrating several measuring sensors, is expandable and reconfigurable to adapt to each application. The combs are advantageously evenly distributed over the circumference of the engine and a single master processing unit 44 remote from the test bench 46 is sufficient to manage the array of combs.

In a first embodiment, represented in FIG. 3, the array of combs (the combs being able to be different in term of number of orifices as illustrated) is connected to the master processing unit 44 by a single wired communication link 50 (for example of the Ethernet or RS485 type as mentioned above) as illustrated having a reduced number of wires, advantageously 4 wires, preferably 2 wires. This single communication link 50 also makes it possible to connect the different combs together (via the slave processing units 38) in order to transmit, advantageously via a single slave processing unit 38, the digital data from the sensors to the master processing unit 44.

In a second embodiment, represented in FIG. 4, the array of combs is connected to the master processing unit 44 via a single wireless communication link 52 (of the LoRa or WiFi type for example). Each of the slave processing units 38 communicates with the slave processing units belonging to the same plane via this single wireless communication link 52, preferably by a wireless emission/reception system 384, advantageously integrated into the unit 38. A slave processing unit of the same plane then transmitting to the master processing unit 44 including its own wireless emission/reception system 440 the digital data coming from the sensors, which can in turn be sent to the test bench 46 which receives them through its emission/reception system 460. In this case, the power supply is provided by the energy management module 382 which preferably includes an integrated energy source such as a battery or by an energy management module also acting as an energy recovery.

Thus, according to the configuration of the invention, a single comb with 8 orifices will make it possible to make 16 measurements=8*P&T for example and an array of 20 combs with 8 orifices will make it possible to make up to 320 measurements simultaneously=20*8*P&T.

It should be noted that if reference was previously made essentially to P&T sensors (that is to say combining a pressure probe and a temperature probe), the types of sensors integrated into the instrumentation combs can be used for any other measurement in an aircraft engine, such as humidity level, gas composition, etc.

The invention allows easier implementation of a test bench to instrument an aircraft engine in terms of P&T because the measurements are directly converted into digital as close as possible to the measurement point to limit the analog disturbances in a harsh environment (HV, noise, etc.) and that only an electronic interface is present on the test bench side. In addition, in case of pressure measurement, the measurement is taken directly at the level of the measurement point and not brought outside the engine, avoiding any loss due to both internal and external tubular connectors.

The invention claimed is:

1. An instrumentation comb for an aircraft engine including:

a central tube with a longitudinal axis on which a determined number of orifices spaced apart along this longitudinal axis are drilled, and a base forming a proximal end of this tube and fixed on a crankcase portion of the aircraft engine, each orifice being associated with a mechanical probe for measuring a physical parameter of the aircraft engine, wherein each mechanical probe is associated with a processing electronic interface, and wherein the base integrates a slave processing unit connected to each of the electronic interfaces by a digital communication link able to receive in real time digital measurement data corresponding to the physical parameters measured by the mechanical probes and communicated to a master processing unit by a single communication link, wherein the aircraft engine includes an array of combs formed of several instrumentation combs, and wherein the instrumentation combs are evenly distributed over a circumference and over several planes of the aircraft engine.

2. The instrumentation comb according to claim 1, wherein the physical parameter is any one or a combination of: pressure, temperature, humidity level or gas composition.

3. The instrumentation comb according to claim 1, wherein the slave processing unit includes a power management module adapted to ensure a power supply of the mechanical probes and of a communication module supporting the single communication link.

4. The array of combs according to claim 1, wherein the slave processing units of the instrumentation combs of a same plane are connected together one by one to form a circle, the single communication link with the master processing unit being achieved from at most one determined slave processing unit of an instrumentation comb of each plane of the array of combs.

5. The array of combs according to claim 1, wherein a slave processing unit of a determined instrumentation comb of a given plane is connected to a slave processing unit of a determined instrumentation comb of another plane.

6. The instrumentation comb according to claim 1, wherein the single communication link is a wired or wireless link.

7. The instrumentation comb according to claim 6, wherein the wired link is of a Ethernet and the wireless link of a WiFi type.

8. A system for collecting measurements of a physical parameter of an aircraft engine comprising:

at least one instrumentation comb according to claim 1;

the master processing unit connected by the digital communication link to a test bench;

said master processing unit being connected to the slave processing unit of said comb by a single communication link to supply energy to said slave processing unit and to transfer the data coming from the mechanical probes.

9. The system according to claim 8, wherein said single communication link is wired or wireless and the digital communication link between the master processing unit and the test bench is a wired or wireless link.

10. An aircraft engine including the instrumentation comb according to claim 1.

11. An aircraft including the aircraft engine according to claim 10.

12. An array of combs formed of several instrumentation combs, wherein the instrumentation combs are evenly distributed over a circumference and over several planes of an aircraft engine, and wherein each of the instrumentation combs including:

a central tube with a longitudinal axis on which a determined number of orifices spaced apart along this longitudinal axis are drilled, and a base forming a proximal end of this tube and fixed on a crankcase portion of the aircraft engine, each orifice being associated with a sensor for measuring a physical parameter of the aircraft engine, wherein the base integrates a slave processing unit connected to each of the measuring sensors by a communication link able to receive in real time digital measurement data corresponding to the physical parameters measured by the measuring sensors and communicated to a master processing unit by a single communication link.

13. The array of combs according to claim 12, wherein the slave processing units of the instrumentation combs of a same plane are connected together one by one to form a circle, the single communication link with the master processing unit being achieved from at most one determined slave processing unit of an instrumentation comb of each plane of the array of combs.

14. The array of combs according to claim 12, wherein a slave processing unit of a determined instrumentation comb of a given plane is connected to a slave processing unit of a determined instrumentation comb of another plane.

15. The array of instrumentation combs according to claim 12, wherein the physical parameter is any one or a combination of: pressure, temperature, humidity level or gas composition.

16. The array of instrumentation combs according to claim 12, wherein the single communication link is a wired or wireless link.

* * * * *